2,968,527
Patented Jan. 17, 1961

2,968,527
METHOD OF RECOVERING TUNGSTIC ACID VALUES FROM AQUEOUS MEDIA

Paul H. Baker, Barberton, Ohio, assignor to Columbia-Southern Chemical Corporation, a corporation of Delaware No Drawing. Filed Oct. 3, 1957, Ser. No. 688,094

7 Claims. (Cl. 23—140)

This invention relates to methods of oxidizing olefinically unsaturated compounds with hydrogen peroxide utilizing a tungstic acid catalyst. It more particularly deals with the recovery and effective utilization of the tungstic acid catalyst in conjunction with such oxidations.

Any of a wide number of reactions involving the oxidation of olefinically unsaturated compounds with hydrogen peroxide rely upon the use of a tungstic acid type catalyst. Most often, the olefinically unsaturated material is hydroxylated or epoxidized to its corresponding dihydroxy or epoxy (oxirane) derivative. Thus, allyl alcohol may be oxidized with hydrogen peroxide in the presence of a tungstic acid catalyst to glycerol or glycidol. Numerous other olefinically unsaturated organic compounds may be hydroxylated or epoxidized by such oxidations.

In processes of this character, tungstic acid catalyst is not only an essential component of the reaction mixture, but being quite costly, it can also represent a prime factor in the economics of such processes. Accordingly, the efficient and repeated use of the tungstic acid catalyst in these oxidation reactions is most desirable.

According to the present invention, a method has now been provided for efficiently recovering tungstic acid catalyst values still possessing catalytic properties. The present invention thus offers a means for recovering tungstic acid type catalysts without destroying their catalytic qualities such that they are suited for catalyzing further oxidation reactions.

Now it has been discovered in accordance with the present invention that tungstic acid catalyst values may be recovered and regenerated in catalytic form from an oxidation reaction medium by a process which involves contacting the oxidation reaction medium containing tungstic acid catalyst with an ion-exchange resin whereby to remove the tungstic acid values from the medium followed by eluting the tungstic acid values recovered in the ion-exchange bed with an aqueous solution of an alkali metal chloride. Thereafter, the tungstic acid values present in the alkali metal salt solution are precipitated by acidifying the solution to a pH below 7, e.g., by the addition of hydrochloric acid. When so recovered, the tungstic acid values precipitate in filterable or otherwise mechanically separable form.

It has been found particularly important to the efficient recovery of tungstic acid values that the elution of the tungstic acid values separated by ion-exchange be accomplished by the use of an aqueous alkali metal chloride solution, and preferably an aqueous solution of sodium chloride. Quite surprisingly, alkali metal chloride solutions elute the tungstic acid values with extreme effectiveness. What is more, the quality of precipitated tungstic acid values obtained by use of the aqueous alkali metal solution eluate is uniformly high. This contrasts with results which have been obtained using aqueous sodium hydroxide solutions to elute ion-exchange beds and recover tungstic acid values.

The terms "tungstic acid" or "tungstic acid values" are used here to define the tungstic acid catalyst whatever its specific form may be. During organic epoxidations involving the use of hydrogen peroxide, the tungstic acid catalyst is believed to be present as pertungstic acid, a product of hydrogen peroxide and tungstic acid. During elution from an ion-exchange bed, the tungstic acid catalyst may be as the water soluble sodium tungstate. Except as hereinafter more specifically defined, either in terms of its actual chemical state or its physical properties such as solubility in water, and when such properties are of significance in the present process, the specific chemical form of the tungstic acid catalyst is not of primary importance. Hence, in many instances, it is suitably characterized by this terminology.

Recovery of tungstic acid catalysts by this invention is of general applicability regardless of the particular organic oxidation process in which the catalyst is employed. Obviously, methods of handling the specific reaction medium of any of the many different oxidations using this catalyst are usually best determined by conditions most appropriate to the specific oxidation reaction. The desirability of separating the oxidized products prior to recovering the tungstic acid values will depend to a large degree on the stability of the oxidized products under conditions beneficial to the recovery of the catalyst. It will be understood that the present invention contemplates the processing of a reaction medium in a manner consistent with the appropriate recovery of the oxidation products while taking into account the particular method of tungstic acid value recovery. It may be advisable apart from any considerations relative to the recovery of catalyst to remove unreacted olefinically unsaturated reactants, the oxidized product or other component excluding the catalyst from the reaction medium prior to catalyst recovery. Performance of any such steps is not excluded by this invention.

In conjunction with oxidations resulting in epoxides (compounds containing oxirane groups) separation of the product prior to the recovery of catalyst may be most desirable particularly when the epoxide tends to decompose or convert to other products under conditions of the catalyst recovery.

Thus, practice of the present invention includes, in conjunction with the recovery of oxidation products and in conformance with conditions best suited for such recovery, the separation of tungstic acid catalyst values from the reaction medium or any portion thereof by contacting such medium with an ion-exchange resin. In this fashion, the tungstic acid values are removed with substantial completeness by the ion-exchange bed. At a convenient time, as when the capacity of the ion-exchange bed to remove the tungstic acid values diminishes beyond the point where its further operation is ineffective or economically unjustified, the contact is discontinued, and thereafter, the tungstic acid values in the ion-exchange bed are eluted by contacting the bed with an aqueous solution of an alkali metal chloride. Ideally used are aqueous sodium chloride solutions containing between 2 and 30 percent sodium chloride by weight. However, other alkali metal chlorides including potassium chloride are useful. Atmospheric conditions of pressure and temperature suffice. However, elution may be conducted at subatmospheric or superatmospheric pressures and at temperatures which permit the use of aqueous alkali metal chloride solutions, e.g., about 0° C. to 100° C., with temperatures between 15° C. and 60° C. the most usually employed.

The actual steps employed in removing the tungstic values from the ion-exchange bed involve in simplest terms simply contacting the bed with such solution. More usually, however, the ion-exchange resin is in the form of a vertically disposed bed, such as is provided by packing a vertically disposed column with resin. Elution with such bed is accomplished by passing a stream of the aqueous alkali metal chloride solution through the bed.

When removed from the ion-exchange resin in this manner, the tungstic acid values are dissolved in the aqueous sodium chloride solution as sodium tungstate according to present beliefs. Separation of the tungstic acid values is accomplished by adjusting the solution to an acidic pH below about 7.0 (preferably between a pH of 2 and 6.5) by addition of an acidifying agent such as hydrochloric acid or the like including inorganic acids, e.g., nitric acid, organic acids, e.g., acetic and acid salts. This precipitates the tungstic acid values which are easily separated by recognized expedients including filtration, centrifugation, decantation and like mechanical expedients. Tungstic acid catalyst values separated in this manner may either be directly or indirectly employed as catalyst for a further organic oxidation. It is, however, better to water wash the separated tungstic acid values.

In those oxidation reactions which are best performed when tungstic acid values are in the chemical form believed to represent the catalytic material, the separated tungstic acid values may be so converted prior to inclusion in the oxidation system. It is generally regarded that the tungstic acid values when reacted with hydrogen peroxide are in their catalytic form. In conformance with such principles, the separated tungstic acid values may be dissolved in aqueous hydrogen peroxide. This results in formation of pertungstic acid, a form in which the tungstic acid values are water soluble, and in which they may be charged to the oxidation reaction mixture.

Synthetic organic (carbonaceous) ion-exchange resins which are chemically inert with respect to solutions containing the tungstic acid values undergoing treatment are satisfactory. Typical of these ion-exchange resins are those produced by sulfonation of polystyrene and copolymers of styrene with vinylbenzene. United States Patents Nos. 2,366,077 and 2,631,127 describe such ion-exchange resins. Other sulfonated soluble materials of high molecular weight such as sulfonated phenol-formaldehyde resins and modified sulfonated phenol-formaldehyde resins also are used. Other included anion-exchange resins are the amino and like nitrogenous resins such as those derived from styrene and its copolymers. Typical resins of this character are described in United States Patent No. 2,591,573. Those anion-exchange resins prepared, for example, by reaction of ammonia or a primary or secondary amine with an insoluble, cross-linked polymer of a glycidol ester of acrylic acid or of an alpha-substituted acrylic acid such as alpha-methylacrylic acid of the type shown in United States Patent No. 2,630,429 likewise are suitable.

Most widely used are the strongly basic and weakly basic anion-exchange resins which are in their hydroxyl or basic form.

For the most part, the effective utilization of such ion-exchange resins involves providing a bed through which the materials may be passed. Most typical beds are established by filling a vertically disposed column with the anion-exchange resins. Beds of this character are composed of a large mass of individual beads of the resin, usually ranging from about 10 to about 100 mesh in bead size. Of course, the bed is maintained in a liquid permeable state such that the materials undergoing treatment as well as the eluted stream may be passed therethrough.

In the usual operation of such a resin bed, the liquid undergoing treatment passes unidirectionally upwardly or downwardly through the bed. The direction of flow being selected at times for convenience.

In a preferred embodiment, the tungstic acid values are dissolved in an aqueous medium. Besides containing the tungstic acid values, this aqueous medium may also contain any unreacted olefinically unsaturated compounds, the oxidation products or by-products of the oxidation reaction in which the tungstic acid catalyst has been utilized as well as hydrogen peroxide or organic peracid such as peracetic acid. In conjunction with the recovery of catalysts from a reaction mixture of the type provided by the hydroxylation of allyl alcohol to glycerol, it is advantageous to establish the solution placed in contact with the ion-exchange resin at an alkaline pH of between 7.5 and 11. With other aqueous tungstic acid values containing media, the more desired pH may vary somewhat. However, it is good practice to employ an aqueous media of alkaline pH. This assures maintenance of the acidic values in the form in which they are most effectively removed by the ion-exchange resins.

The following examples illustrate the manner in which the present invention may be practiced:

EXAMPLE I

Fifty grams of Amberlite IRA–400 (a strongly basic polystyrene quaternary amine type resin manufactured by Rohm and Haas Company) were placed in a vertically disposed glass column having an inner diameter of 18.5 millimeters, thereby forming a resin bed. This bed was classified by passing water through the bed and thereafter converted to its hydroxyl form by elution with 320 cubic centimeters of sodium hydroxide solution containing 5 percent sodium hydroxide by weight.

A one liter volume of an aqueous solution of sodium tungstate (an aqueous solution containing tungstic acid catalyst values which has been adjusted to a pH 9 to 10 by the addition of sodium hydroxide) containing 5.165 grams of tungstate values measured as $WO_3$ was passed through this column operated at atmospheric pressures and temperatures (about 25° C.). All the tungstic acid values were removed by the ion-exchange resin bed.

The bed was thereafter eluated with 350 cubic centimeters of a sodium chloride solution containing 4 percent sodium chloride by weight. This eluate contained 5.19 grams of tungstic acid catalyst measured as $WO_3$, indicative of complete elution of the tungstic acid values from the ion-exchange bed.

The concentration of tungstic acid values in this eluate was 10.38 milligrams of $WO_3$ per milliliter. The eluate was divided into several portions of varying volumes and acidified by addition of concentrated hydrochloric acid (32 percent HCl by weight) to precipitate the tungstic acid, following which the precipitates were heated to from 80 to 100° C. for about an hour, cooled to room temperature and filtered.

Thereafter, the precipitates were washed with about 50 to 75 cubic centimeters of dilute hydrochloric acid containing 5 percent hydrogen chloride by weight, and then they were dissolved by the alternate addition of 10 cubic centimeter portions of distilled water and aqueous hydrogen peroxide solutions containing 50 percent by weight $H_2O_2$. The amount of tungstic acid values present as $WO_3$ was then determined by analytic technique.

The following Table I tabulates the various conditions under which portions of the above obtained eluate were treated to recover tungstic acid catalyst values:

Table I

TUNGSTEN RECOVERY FROM IRA-400 ELUATES

| Run | 1 | 2 | 3 | 4 |
| --- | --- | --- | --- | --- |
| Eluate Used | NaCl | NaCl | NaCl | NaCl |
| Volume, Milliliters | 130 | 100 | 100 | 100 |
| $WO_3$ Present, Milligrams | 1349 | 1038 | 1038 | 1038 |
| Concentrated HCl Added, Milliliters | 20 | 15 | 15 | 15 |
| Color of $WO_3$ Precipitate | Yellow | Yellow | Yellow | Yellow |
| Peroxide Solution of $WO_3$: | | | | |
| Amount, Grams | 65.4 | 98.5 | 97.9 | 82.3 |
| $WO_3$, Milligrams/Grams | 10.3 | 7.8 | 7.3 | 8.4 |
| Appearance | Clear | Cloudy | Cloudy | Cloudy |
| $WO_3$ Recovery, Percent | 86.1 | 74.3 | 68.8 | 66.7 |

Tungstic acid catalyst values recovered in the foregoing manner are most satisfactory for catalyzing reactions of olefinically unsaturated organic compounds.

Thus, the hydrogen peroxide solution of tungstic acid values recovered in accordance with run 1 in the above table was employed in the oxidation of allyl alcohol to glycerin. Some 28.1 grams of this hydrogen peroxide solution of tungstic acid catalyst containing 2.14 millimoles of $H_2WO_4$ (tungstic acid) was mixed with 58.4 grams of allyl alcohol and 126.8 grams of distilled water in a glass flask. With the temperature of the reaction mixture maintained at about 70° C., a total of 24.5 grams of aqueous hydrogen peroxide solution containing 50 percent hydrogen peroxide by weight was added over a period of 16 minutes and the reaction permitted to proceed for a total of 66 minutes. Thereafter, 8.75 millimoles of sodium hydroxide was added, the excess allyl alcohol recovered by distillation followed by recovery of glycerin by fractional distillation. A total of 0.373 mole of glycerin was thereby recovered, representing a 74.6 percent yield basis the amount of hydrogen peroxide employed and a 72.6 percent yield basis the allyl alcohol consumed.

In contrast to the effective recovery of tungstic acid values achieved by the procedure above described, the use of sodium hydroxide solutions to elute such values from an ion-exchange bed is less effective. The quality of tungstic acid precipitates obtained from sodium hydroxide eluate is inconsistent. Substantially higher recoveries are obtained using aqueous sodium chloride solutions and the quality of the tungstic acid values subsequently obtained by acidification is uniformly acceptable. A further advantage offered by sodium chloride solutions is the wide latitude of operational conditions under which it is effective. Thus, the removal of tungstic acid values from ion-exchange resins with aqueous solutions of sodium chloride occurs quite readily even when the resin has not reached its exchange capacity for tungstic acid values. With aqueous sodium hydroxide solutions, it is necessary to defer elution until the ion-exchange resin has reached its capacity.

This process is suited to the removal of tungstic acid values from a wide variety of solutions. Primarily, aqueous solutions of such tungstic acid values are treated with ion-exchange when their pH is alkaline or adjusted to an alkaline pH above 7, notably in the range of 9 to 11. Often, this is accomplished by the addition of sodium hydroxide. This apparently enhances the effectiveness of the ion-exchange and insures the presence of tungstic acid values as dissolved sodium tungstate. Any concentration of tungstic acid catalyst values in solution is appropriate. However, for practical purposes, it is usually preferable that the aqueous solution contain between 0.05 and 5.0 percent by weight tungstic acid values measured as $WO_3$.

While reference has been made to the recovery by anion-exchange of tungstic acid values from an aqueous solution thereof, it will be appreciated that various other components which are non-aqueous may be present. Thus, the medium may include any unreacted olefinically unsaturated material, the oxidized reaction products, hydrogen peroxide, reaction by-products and the like.

A wide variety of oxidation reactions relying upon hydrogen peroxide may be conducted using tungstic acid catalysts. These include oxidations in which the primary product is an epoxide (oxirane), reactions in which the oxidation products are hydroxyl products and in which the hydroxylation involves satisfying the olefinically unsaturated group with a pair of hydroxyl groups, and other such oxidation reactions. This recovery of tungstic acid catalyst values is applicable to reaction media obtained during the course of such oxidation reactions.

While this invention has been described with reference to specific details of certain embodiments, it is not intended that the invention be construed as limited to such specific details except insofar as such details are found in the appended claims.

I claim:

1. A method of recovering tungstic acid values from aqueous media containing the same which comprises removing tungstic acid values from the media by contacting it with an ion-exchange resin, eluting the ion-exchange resin by contact with an aqueous solution of an alkali metal chloride and thereafter precipitating the tungstic acid values from the aqueous alkali metal chloride solution.

2. The method of claim 1 wherein the alkali metal chloride solution is an aqueous sodium chloride solution containing between 2 and 30 percent sodium chloride by weight.

3. A method of recovering tungstic acid values from aqueous media containing the same, the steps which comprise passing the aqueous media having an alkaline pH through an anion-exchange resin bed whereby to remove from the media by ion-exchange tungstic acid values, thereafter eluting said bed by passage therethrough of an aqueous solution of an alkali metal chloride, acidifying the aqueous alkali metal chloride solution containing tungstic acid values removed from the ion-exchange bed to an acidic pH whereby to precipitate tungstic acid values and separating said tungstic acid values.

4. A method of recovering tungstic acid values which comprises contacting an aqueous media containing tungstic acid values having an alkaline pH with an anion-exchange resin, thereafter contacting the ion-exchange resin with aqueous alkali metal chloride solution to elute separated tungstic acid values, acidifying the eluate alkali metal chloride solution to an acidic pH to precipitate tungstic acid values and separating mechanically the precipitate.

5. A method of recovering tungstic acid values from aqueous media containing the same which comprises contacting the media with an ion-exchange resin thereby removing tungstic acid values from the media, eluting the ion-exchange resin containing tungstic acid values by contact with an aqueous solution of an alkali metal chloride thereby obtaining an aqueous alkali metal chloride solution containing tungstic acid values and precipitating tungstic acid values from the aqueous alkali metal chloride solution.

6. A method of recovering from an ion-exchange resin tungstic acid values therein which comprises eluting the ion-exchange resin with an aqueous alkali metal chloride solution, acidifying the aqueous alkali metal chloride solution containing tungstic acid values and recovering the precipitated tungstic acid values.

7. A method of recovering tungstic acid values from aqueous media containing the same which comprises contacting the media with an anion-exchange resin in hydroxyl form thereby removing tungstic acid values from the media, eluting the anion-exchange resin containing tungstic acid values by contact with an aqueous solution of an alkali metal chloride thereby obtaining an aqueous alkali metal chloride solution containing tungstic acid values and precipitating tungstic acid values from the aqueous alkali metal chloride solution.

References Cited in the file of this patent

UNITED STATES PATENTS

| | | |
|---|---|---|
| 2,244,325 | Bird | June 3, 1941 |
| 2,559,529 | Bauman | July 3, 1951 |
| 2,735,748 | Wainer | Feb. 21, 1956 |

OTHER REFERENCES

Mellor: "Comprehensive Treatise on Inorganic and Theoretrical Chemistry," Longmans, Green and Co., New York, 1923, vol. 11, pages 763–765.

Yu. Yu. Lur'e et al. in "Chemical Abstracts," vol. 42, col. 4484 (1948).

Samuelson: "Ion Exchanges in Analytical Chemistry," John Wiley and Sons, Inc., N.Y., 1953, pages 69, 76, 77 and 153.

Kunin et al.: "Ion Exchange Resins," John Wiley and Sons, Inc., New York, 1950, pages 69, 125 and 126.

Beohner et al. in "Industrial and Engineering Chemistry," vol. 41, No. 3, pages 448–459, March 1949.

Kunin et al.: in "Industrial and Engineering Chemistry," vol. 45, No. 1, pages 83–88, January 1953.

UNITED STATES PATENT OFFICE
CERTIFICATE OF CORRECTION

Patent No. 2,968,527                                 January 17, 1961

Paul H. Baker

It is hereby certified that error appears in the above numbered patent requiring correction and that the said Letters Patent should read as corrected below.

Column 6, line 40, after "chlo-" insert -- ride solution to an acidic pH thereby precipitating tungstic --.

Signed and sealed this 9th day of January 1962.

(SEAL)
Attest:

ERNEST W. SWIDER                              DAVID L. LADD
Attesting Officer                                 Commissioner of Patents